(12) United States Patent
Inoue et al.

(10) Patent No.: US 6,913,390 B2
(45) Date of Patent: Jul. 5, 2005

(54) ROTATING SHAFT APPARATUS (75) Inventors: Shinichi Inoue, Kanagawa (JP);
Hideshi Sato, Kanagawa (JP);
Kazumasa Kono, Kanagawa (JP)

(73) Assignee: Makino Milling Machine Company, LTD, Tokyo (JP)

( * ) Notice: Subject to any disclaimer, the term of this patent is extended or adjusted under 35 U.S.C. 154(b) by 126 days.

(21) Appl. No.: 10/399,160

(22) PCT Filed: Aug. 9, 2002

(86) PCT No.: PCT/JP02/08199

§ 371 (c)(1),
(2), (4) Date: Apr. 10, 2003

(87) PCT Pub. No.: WO03/016733

PCT Pub. Date: Feb. 27, 2003

(65) Prior Publication Data

US 2004/0013335 A1 Jan. 22, 2004

(30) Foreign Application Priority Data

Aug. 13, 2001 (JP) .......................................... 2001-245521
Aug. 13, 2001 (JP) .......................................... 2001-245696

(51) Int. Cl.$^7$ .......................... F16C 33/76; F16C 19/54; F16C 3/16; F16C 37/00
(52) U.S. Cl. ........................ 384/476; 384/445; 384/452; 384/900; 384/321; 409/135; 409/231
(58) Field of Search ................................ 384/476, 445, 384/448, 452, 454, 900, 317, 321; 409/135, 231

(56) References Cited

U.S. PATENT DOCUMENTS

| | | | | |
|---|---|---|---|---|
| 3,555,962 A | * | 1/1971 | Wolf et al. ................. | 409/231 |
| 4,402,559 A | * | 9/1983 | Shibata et al. .............. | 384/476 |
| 4,602,874 A | * | 7/1986 | Neugebauer ................ | 384/476 |
| 4,919,575 A | * | 4/1990 | Yoshimi et al. ............. | 409/231 |
| 5,192,139 A | * | 3/1993 | Hiramoto et al. ........... | 384/476 |
| 5,779,405 A | * | 7/1998 | Aiso et al. .................. | 409/132 |
| 5,798,587 A | * | 8/1998 | Lee ............................. | 310/58 |
| 6,293,703 B1 | * | 9/2001 | Date ........................... | 384/476 |
| 6,373,158 B1 | * | 4/2002 | Hsu et al. .................... | 310/90 |
| 6,464,435 B1 | * | 10/2002 | Chen .......................... | 409/231 |

FOREIGN PATENT DOCUMENTS

| | | | |
|---|---|---|---|
| JP | 61-68848 | | 5/1986 |
| JP | 5-209628 A | | 8/1993 |
| JP | 6-134651 A | | 5/1994 |
| JP | 9-96312 A | | 4/1997 |
| JP | 9-280257 A | | 10/1997 |
| JP | 2000-158288 | * | 6/2000 |
| JP | 2001-208088 A | | 8/2001 |

* cited by examiner

*Primary Examiner*—David A. Bucci
*Assistant Examiner*—Colby Hansen
(74) *Attorney, Agent, or Firm*—Paul & Paul (57) ABSTRACT

A shaft 17 defines a front end portion 17a having a larger diameter and an opposite tail end portion 17b having a smaller diameter, the shaft 17 being rotatably supported by the housing 13 through a radial bearing 19 and a pair of angular ball bearings 21 at the front side large diameter portion 17a and the small diameter portion 17b, respectively.

4 Claims, 5 Drawing Sheets

ROTATING SHAFT APPARATUS

TECHNICAL FIELD

The invention relates to a rotating shaft apparatus such as a spindle apparatus of a machine tool or an industrial machine.

BACKGROUND ART

The shaft of a rotating shaft apparatus, such as a spindle of a machine tool, receives radial and thrust load. Therefore, the bearings rotationally supporting the shaft are determined in consideration of such loads. For example, Japanese Patent No. 3080253, as a first prior art, discloses a spindle which is rotatably supported by a pair of angular ball bearings and a radial ball bearing, at the front and tail end portions of the spindle, respectively. In general, a pair of angular ball bearings are disposed at the front side of the spindle. Further, Japanese Unexamined Patent Publication (Kokai) No. 7-310742, as a second prior art, discloses a configuration of a spindle which is rotatably supported by a pair of angular ball bearings and a cylindrical roller bearing, at the front and tail end portions of the spindle, respectively.

Japanese Patent No. 2677505, as a third prior art, discloses a spindle apparatus of a machine tool in which lubricating liquid is supplied into the spindle from the tail end thereof for the purpose of the cooling of the core portion of the spindle. Then, the lubricating liquid is further used for lubricating the bearings and for cooling the housing rotationally supporting the spindle. Further, Japanese Unexamined Patent Publication (Kokai) No. 6-134651, as a fourth prior art, discloses a spindle apparatus which is provided with first and second cooling units for controlling the temperature of a lubricating oil supplied into the space of a bearing, in which space the bearing balls rotate, through a central portion of the spindle, and for controlling the temperature of cooling liquid supplied into a cooling jacket defined in the housing. The first and second cooling units are controlled on the basis of the temperatures of the spindle and the housing Recently, in the field of rotating shaft apparatuses for machine tools, increasing in the rotational speed of the shaft has been required and, therefore, the loads, on the bearings for rotationally supporting the shaft, have been also increased according to the increase in the rotational speed. Thus, DN value (the product of the inner diameter of a bearing and the rotational speed) becomes higher because the diameter of a shaft and the rotational speed thereof are increased. The higher the DN value of a shaft, the shorter the life of the bearings supporting the shaft becomes and, therefore, expensive bearings are required. Particularly, in an angular ball bearing, contacting angles are defined between the balls and the inner and outer races, which results in spinning motions of the balls and slippage of balls relative to the inner and outer races, which further results in rupturing the lubricating oil film. The centrifugal force on the balls affects on the spinning motions of the balls and, therefore, the larger the DN value, the larger the problem becomes in connection with the spinning motions of the balls of an angular ball bearing.

Further, the radial force acting on the front end portion of a shaft, to which a functional member such as a tool of a machine tool is attached, is generally larger than that acting on the tail end portion of the shaft. Therefore, there is a merit in providing the front end portion of a shaft with a diameter larger than that of the tail end portion. However, the larger the diameter of a shaft, the larger must be the diameter of the bearing. In this connection, according to the first prior art, the sizes of the angular bearings must be increased, because the spindle is rotatably supported at the front end portion by the pair of back-to-back angular bearings.

According to the second prior art, although the spindle is rotatably supported at the tail end portion by the back-to-back angular bearings, the spindle is formed with a constant diameter in the longitudinal direction, and therefore there is a problem, the same as in the first prior art, in connection with the increase in DN value accompanied with the increase in the rotational speed and the diameter of the shaft.

On the other hand, in high-speed rotating shaft apparatuses of which rotational speed is higher than 20,000 $\text{min}^{-1}$, such as recent spindle apparatuses of machine tools, the internal pressure generated in the bearings for rotationally supporting the shaft must be strictly controlled. In particular, the higher the rotational speed of a shaft, the larger the outer diameters of the inner races of bearings supporting the shaft become due to the centrifugal force and the thermal expansion thereof. On the other hand, the outer diameter of the outer races is restrained by the housing. Therefore, the inner diameter of the outer race is not increased by the centrifugal force. Further, the housings of the most high speed rotating shaft apparatuses are cooled. In such a case, if the housing is too cool, excessive internal pressure is applied to the rolling elements disposed between the inner and outer races, because the outer race cannot thermally expand. Therefore, the internal race and the rolling elements are urged to the outer race so that the heat generation due to the friction between the inner race, the outer race and the rolling elements is increased, which results in damage to the bearing.

Thus, in order to prevent the excessive internal pressure on the rolling elements of a bearing, the temperatures of the spindle (the inner race) and the housing (the outer race) must be precisely controlled. In this connection, according to the third prior art, the housing is cooled by the lubricating oil, which has been heated by cooling the spindle core. Therefore, a cooling condition of the housing cannot be clearly obtained and optimal control of the temperatures of the spindle and the housing cannot be conducted. Therefore, according to the configuration of the third prior art, there is a problem that an optimal control of the temperatures of the inner and outer races of the bearings, attached to the spindle and the housing, respectively, cannot be conducted.

In this connection, according to the fourth prior art, although the first and second cooling units are controlled on the basis of the detection results from first and second temperature sensors for detecting the housing and the spindle, respectively, the first and second cooling units of the fourth prior art control the temperatures of the coolant and the lubricating oil so as to reduce the temperature gradient between the housing and the spindle. As described above, the diameter of an inner race is increased by the centrifugal force in addition to its thermal expansion. Therefore, the temperature of an inner race must be controlled in consideration of the rotational speed of the spindle. However, according to the fourth prior art, the temperatures of the inner and outer races are not measured and, therefore, the heat generated by the friction between the inner race, the outer race and the rolling elements cannot be eliminated, which may result in seizure of the bearing. Further, in the fourth prior art, the first temperature sensor detects the exterior of the housing and the second temperature sensor detects the outer surface of the front end portion of the spindle. Therefore, the temperature of the heat generating portion in the bearing cannot be precisely detected because the sensors do not detect the temperatures of the inner and outer races of the bearing.

Further, some rotating shaft apparatuses include a drive motor, that is a built-in motor disposed in the housing for rotationally driving the spindle. In such a built-in motor type rotating shaft apparatus, the housing is heated by the drive motor, in particular by its stator. Therefore, in order to cool the housing of a built-in motor type rotating shaft apparatus, the stator and a portion of the housing adjacent the stator are mainly cooled. However, in some cases, the housing is heated in the contrary by the coolant heated through the cooling of the stator. According to the third prior art, the lubricating liquid, which has been heated through the cooling of the spindle core, flows through a spiral passage adjacent the stator. However, the stator cannot be sufficiently cooled by this configuration, and the heated lubricating liquid acts as a thermal medium heating the housing.

SUMMARY OF THE INVENTION

The present invention is directed to solve the above-described problems of the prior art and the objective is to provide a rotating shaft apparatus adapted to a high speed and high rigidity of the shaft.

Further, the objective of the invention is to provide a rotating shaft apparatus adapted to provide a high speed and high rigidity of the shaft by optimizing the cooling of the shaft and the housing.

Further, the objective of the invention is to provide a rotating shaft apparatus in which the temperatures of the inner and outer races of the bearings supporting the shaft and the coolant are separately controlled on the basis of detection results to control the internal pressure of the bearings disposed between the shaft and the housing, which prevents damage to the bearings.

Further, the objective of the invention is to provide a rotating shaft apparatus in which the housing can be optimally cooled.

In order to achieve the above-described objectives, according to the present invention, the shaft is rotatably supported, at a loaded side, by a cylindrical roller bearing or a radial ball bearing of a large diameter and at the opposite side, by a pair of angular ball bearings of a small diameter.

Further, according to the invention, the shaft and the housing are cooled.

Further, according to the invention, inner race temperature detecting means for detecting the temperature of the inner race of the bearing rotationally supporting the shaft at the loaded side, and outer race temperature detecting means for detecting the temperature of the outer race of the bearing, rotationally supporting the shaft at the loaded side, are provided to control the internal pressure of the bearing within an appropriate range by controlling the temperature of the coolant, supplied into the cooling passage of the shaft higher than that of the coolant supplied into the cooling passage of the housing, on the basis of the detection results.

Further, in the present invention, the shaft, the motor and the housing are cooled by separate systems.

According to the invention, there is provided a rotating shaft apparatus for rotationally driving a shaft comprising a housing, a shaft rotatably supported in the housing by a cylindrical roller bearing or a radial ball bearing, which has a larger diameter, at a loaded side and by a pair of angular ball bearings, which have a smaller diameter, at the opposite side and a drive motor for rotationally driving the shaft.

According to the invention, there is provided a rotating shaft apparatus for rotationally driving a shaft comprising a housing, a shaft rotatably supported in the housing by a cylindrical roller bearing or a radial ball bearing, which has a larger diameter, at a loaded side and by a pair of angular ball bearings, which have a smaller diameter, at the opposite side, a drive motor for rotationally driving the shaft, spindle core cooling means, having a cooling passage defined in the shaft along the center axis thereof, for cooling the shaft with a coolant supplied into the coolant passage and housing cooling means, having a coolant passage defined in the housing, for cooling the shaft with the coolant supplied into the coolant passage.

Further, according to the invention, there is provided a rotating shaft apparatus for rotationally driving a shaft comprising a housing, a shaft rotatably supported in the housing by a cylindrical roller bearing or a radial ball bearing, which has a larger diameter, at a loaded side and by a pair of angular ball bearings, which have a smaller diameter, at the opposite side, a drive motor for rotationally driving the shaft, first cooling means, having a cooling passage defined in the shaft along the center axis thereof, for cooling the shaft with a coolant supplied into the coolant passage, second cooling means, having a coolant passage defined in the housing, for cooling the shaft with the coolant supplied into the coolant passage, inner race temperature detecting means for detecting the temperature of the inner race of the bearing for rotationally supporting the shaft at the loaded side, outer race temperature detecting means for detecting the temperature of the outer race of the bearing for rotationally supporting the shaft at the loaded side, the first cooling means controlling the temperature of the coolant to be supplied into the cooling passage of the shaft on the basis of the temperature of the inner race detected by the inner race temperature detecting means, and the second cooling means controlling the temperature of the coolant to be supplied into the cooling passage of the housing on the basis of the temperature of the outer race detected by the outer race temperature detecting means.

When a shaft rotates at a high speed, the inner race of a bearing is expanded by the centrifugal force, and the rolling elements are urged to the outer race. According to the invention, the second cooling means controls the temperature of the coolant to be supplied into the coolant passage of the housing so that the temperature of the outer race of the bearing is higher that that of the inner race of the bearing by a predetermined temperature.

Further, according to the invention, there is provided a rotating shaft apparatus for rotationally driving a shaft comprising a housing, a shaft rotatably supported by the housing through bearings, a drive motor, having a stator secured to the housing and a rotator secured to the shaft to face to the stator, for rotationally driving the shaft, shaft cooling means, having a cooling passage defined in the shaft along the center axis thereof, for cooling the shaft with a coolant supplied into the coolant passage, motor cooling means, disposed in the housing and having coolant passage for cooling the periphery of the stator, for cooling the motor with the coolant supplied into the coolant passage and housing cooling means, disposed in the housing and having a coolant passage dispose outside of the motor cooling means, for cooling the housing with the coolant supplied into the coolant passage.

Further, according to the invention, there is provided a rotating shaft apparatus for rotationally driving a shaft comprising a housing, a shaft rotatably supported in the housing by a plurality of bearings disposed apart from each other, a drive motor for rotationally driving the shaft, first cooling means, having a cooling passage defined in the shaft along the center axis thereof, for cooling the shaft with a coolant supplied into the coolant passage, second cooling means, having a coolant passage defined in the housing, for cooling the shaft with the coolant supplied into the coolant passage, inner race temperature detecting means for detecting the temperature of the inner race of the bearing for rotationally supporting the shaft at the loaded side, outer race temperature detecting means for detecting the temperature of the outer race of the bearing for rotationally supporting the shaft at the loaded side, the first cooling means controlling the temperature of the coolant to be supplied into the cooling passage of the shaft on the basis of the temperature of the inner race detected by the inner race temperature detecting means, and the second cooling means controlling the temperature of the coolant to be supplied into the cooling passage of the housing on the basis of the temperature of the outer race detected by the outer race temperature detecting means.

The second cooling means preferably controls the temperature of the coolant to be supplied into the coolant passage of the housing so that the temperature of the outer race of the bearing is higher that that of the inner race of the bearing by a predetermined temperature.

The bearing for the front side of the shaft to which larger load is applied has a larger diameter and the bearing for the rear side to which smaller load is applied has a smaller diameter.

The front side bearing comprises a cylindrical roller bearing or a radial ball bearing which can bear a high radial load and the rear side bearing comprises a pair of angular ball bearings for receiving the radial and thrust loads. Therefore, the invention provides a rotating shaft apparatus which ensures the rigidity required of rotating shaft apparatuses, reduces the heat generation, and is suitable for high speed rotation. Further, according to the invention, the diameter of the shaft can be reduced to reduce its weight, which allows rapid control of the rotational speed of the shaft. According to the invention, because angular bearings are disposed at the smaller diameter portion of the shaft, relatively small angular bearings can be used to reduce the size of the rotating shaft apparatus and the production cost thereof. Further, according to the invention, the spinning motions of the angular ball bearings are reduced and therefore, the heat generation is also reduced. Therefore, a rotating shaft apparatus which is improved to increase its durability, reliability and rotational speed with relatively high DN value is realized.

The cooling of the shaft and the housing allows the thermal deformation in the shaft and the housing to be reduced. Therefore, a rotating shaft apparatus which can rotate at a high speed with high precision is realized.

According to the invention, the temperatures of the inner and outer races of the bearing can be directly detected and, on the basis of the detection results, the coolant supplied into the cooling passages in the shaft and the housing is controlled. Therefore, the coolant temperature can be precisely controlled. This allows the control of the internal pressure of the bearing, rotationally supporting the shaft, within an appropriate range, which reduces the heat generation due to the friction between the inner race, the outer race and the rolling elements to prevent the damage to the bearing when heat is generated during high speed rotation of the shaft. Therefore, the shaft can rotate at high speed because the heat generated in the bearing is reduced.

By lowering the temperature of the inner race of the bearing to lower than that of the outer race, the pressure on the rolling elements to the outer race, due to the thermal expansion, is reduced. This allows an appropriate internal pressure of the bearing and reduces the heat generation, due to the friction, between the outer race and the rolling elements of the bearing, which prevents damage to the bearing.

According to the invention, by providing the shaft with shaft cooling means and by providing the housing with motor cooling means and housing cooling means, the motor which generates much heat and the housing can be effectively cooled by the coolant supplied into the shaft, the motor and the housing through separate systems. Further, the shaft and the housing can be cooled separately from each other. Therefore, a precise rotating shaft apparatus is realized by reducing the thermal deformations in the shaft and in the housing.

BEST MODE FOR CARRYING OUT THE INVENTION

With reference to the drawings, a preferred embodiment of the invention will be described below. In this connection, in the embodiment described below, a spindle apparatus of a machine tool is described as an example of the rotating shaft apparatus.

Figure 1:
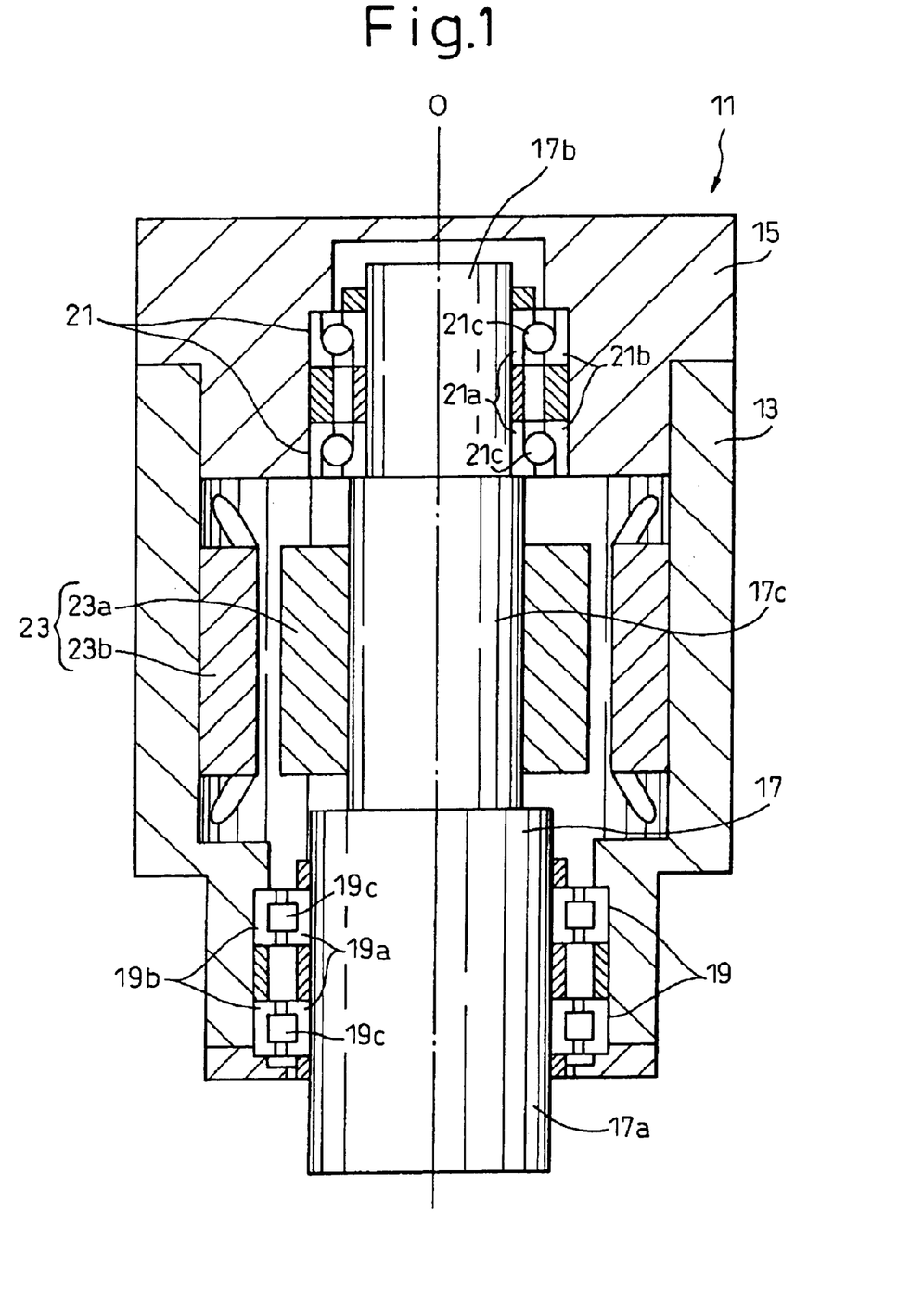
FIG. 1 is a section of a preferable embodiment of a rotating shaft apparatus.

With reference to FIG. 1, a rotating shaft apparatus 11 comprises a shaft 17 rotatably supported by bearings 19 and 21 within a housing 13 and 15. The housing 13 and 15 has a housing body 13 and a rear cover 15 for closing the rear open end of the housing body 13. The shaft 17 has a front end portion 17a, a rear end portion 17b opposite to the front end portion 17a and an intermediate potion 17c between the front and rear end portions 17a and 17b. A functional member such as a tool (not shown) of the machine tool is attached to the front end portion 17a (loaded side) of the shaft 17. The housing body 13 accommodates a drive motor 23 for rotationally driving the shaft 17 about its central axis O. The drive motor 23 has a rotor 23a secured to the intermediate potion 17c of the shaft 17 and a stator 23b secured to the inner surface of the housing body 13 facing the rotor 23a.

In this embodiment, the shaft 17 has a diameter, at the front end portion 17 or a potion adjacent the front end portion 17a, larger than that of the rear end portion 17b or a portion adjacent the rear end portion 17b. In this particular embodiment, the diameter of the front end portion 17a is φ75 mm and the diameter of the rear end portion 17b is φ55 mm. On the other hand, the bearings 19 and 21, for rotationally supporting the shaft 17, including a front side-bearing 19 for rotationally supporting the front end portion or a portion adjacent the front end portion of the shaft 17 and a rear side bearing 21 for rotationally supporting the rear end portion 17b or a portion adjacent the rear end portion of the shaft 17. The front side bearing 19 preferably comprises a radial bearing including an inner race 19a secured to the outer surface of the shaft 17, an outer race 19b secured to the inner surface of the housing 13 and rolling elements 19c disposed between the inner and outer races 19a and 19b. In FIG. 1, a cylindrical roller bearing is shown as the front side bearing 19. The front side bearing 19 may comprise a radial ball bearing. The rear side bearing 21 comprises back-to-back angular ball bearings, which include inner races 21a secured to the outer surface of the shaft 17, outer races 21b secured to the inner surface of the housing 13 and rolling elements 21c disposed between the inner and outer races 21a and 21b.

In general, in rotating shaft apparatuses, the radially force acting on the front end portion, to which a functional member such as a tool is attached, is larger compared to the rear end portion. Therefore, it is advantageous to design a shaft so that the diameter of the front end portion of the shaft is larger than that of the rear end portion. However, the larger the diameter of the shaft, the larger must be the size of the bearings. In particular, if the front side of the shaft is supported by back-to-back angular ball bearings, the larger angular ball bearings are required. The heat generated in an angular ball bearing increases with DN value, as described above. Further, angular ball bearings are used as pairs, and are very expensive compared with standard radial bearings. Therefore, rotationally supporting the front side of a shaft by angular bearings considerably increases the cost of a rotating shaft apparatus. On the other hand, the radial force acting on the rear side of a shaft is much smaller than that acting on the front side, and therefore the diameter can be reduced. Therefore, if the rear end portion or a portion adjacent the rear end portion 17b of the shaft 17 by a pair of back-to-back angular ball bearings to bear the radial load in the radial direction and the thrust load in the axial direction, the sizes of the angular bearings can be reduced so as to reduce the heat generation, because of the smaller DN value, and the cost of the rotating shaft apparatus.

Figure 2:
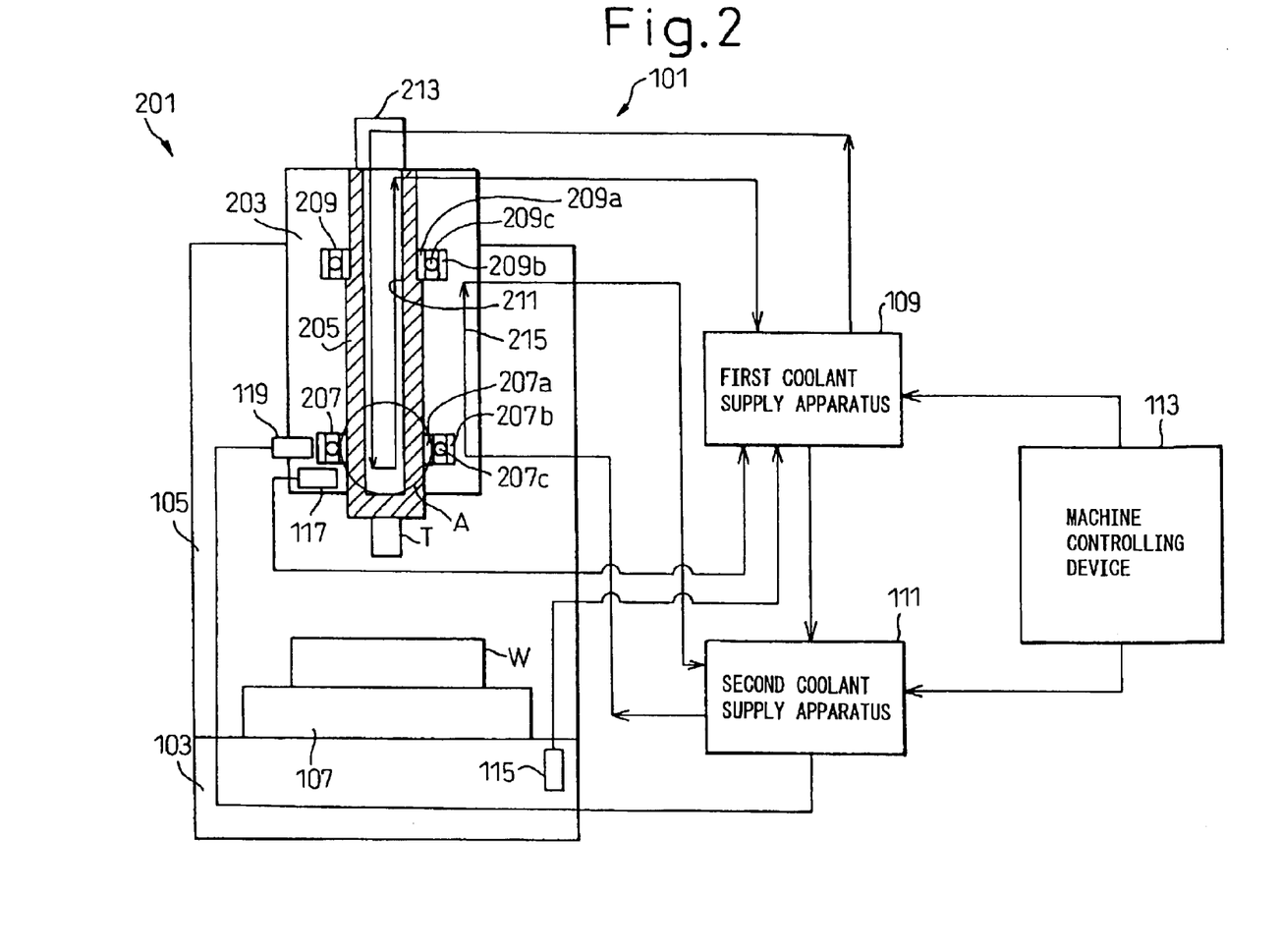
FIG. 2 is a schematic diagram of a machine tool which is provided with a rotating shaft apparatus of the invention.

With reference to FIG. 2, an application of a rotating shaft apparatus according to the invention to a machine tool will be described below.

In FIG. 2, a machine tool 101 comprises a bed 103 secured to the floor of a factory, a column 105 secured to the top of the bed 103, a table 107, mounted to the top of the bed 103 for linear movements in orthogonal two horizontal directions (X- and Y-axes directions), for mounting a work W. A spindle head 201 is mounted to the column 105 for linear movement in the vertical direction (Z-axis direction). The table 107 is driven by X- and Y-axes feeding devices (not shown) provided within the bed 103, and the spindle head 201 is driven by a Z-axis feeding device (not shown) provided within the column 105. Each of the X-, Y- and Z-axes feeding devices includes a screw shaft (not shown) extending along each of the X-, Y- and Z-axes and a servomotor (not shown) for rotationally driving the screw shaft. The servomotors for driving the screw shafts and a spindle drive motor (indicated by 223 in FIG. 3) for driving the spindle 205 are controlled by a machine controlling device 113. The machine controlling device 113 and an NC device (not shown) further control the whole of the machining process executed by the machine tool 101 as well as the servomotors and the spindle drive motor.

The spindle head 201 includes a housing 203 mounted to the front face of the column 105 for linear movement in the Z-axis direction and a spindle 205 as a shaft. The spindle 205 extends in the Z-axis direction within the housing 203, and a tool T is attached to the front end of the spindle to face the table 107. Further, the spindle 205 is rotatably supported by the housing 203 through bearings 207 and 209 at the front and rear portions, respectively. Those skilled in the art will understand that, in order to attach the tool T to the spindle 205, the spindle 205 includes a tapered hole (not shown) for receiving a tapered portion provided at the tail end of a tool holder holding the tool T and a tool securing device including a draw bar is provided within the spindle 205 for securing the tool T or the tool holder within the tapered hole. Incidentally, the feeding devices of the machine tool are not limited to the above-described ones and a horizontal rotating axis may be employed.

Further, the spindle 205 includes a spindle core cooling passage 211 extending along its longitudinal axis. A coolant is supplied from a first coolant supply apparatus 109 into the spindle core cooling passage 211 through a rotary joint 213 provided at the tail end of the spindle 205. The coolant returns to the first coolant supply apparatus 109 after the coolant flows through the spindle core cooling passage 211 to cool the spindle 205. The first coolant supply apparatus 109 includes a tank (not shown) for containing the coolant, a coolant circulation pump (not shown) for feeding the coolant, a coolant temperature controlling device (not shown) for cooling and controlling the coolant temperature to a predetermined temperature. Further, the first coolant supply apparatus 109 is connected to the machine controlling device 113 to receive a start-up signal for the first coolant supply apparatus 109 and information relative to the rotational speed N ($min^{-1}$) of the spindle 205.

The housing 203 comprises a hollow member for accommodating the substantial portion of the spindle 205 and for rotationally supporting the spindle 205 through the bearings 207 and 209. In order to rotate the spindle 205 at a speed of above 20,000 $min^{-1}$, the bearings 207 and 209 preferably comprise rolling bearings having inner races 207a and 209a, outer races 207b and 209b and rolling elements 207c and 209c disposed between the inner races 207a and 209a and the outer races 207b and 209b. More preferably, the bearing 207, which supports the front end portion, the loaded side, of the spindle 205, comprises a radial bearing such as a ball bearing comprising a plurality of balls as the rolling elements 207. On the other hand, the bearing 209, which rotationally supports the rear end portion of the spindle 205, preferably comprises a pair of back-to-back angular bearings. The bearings 207 and 209 are lubricated by an advantageous method such as an oil-air lubrication method.

The housing 203 defines a housing coolant passage 215. A coolant is supplied from a second coolant supply apparatus 111 into the housing coolant passage 215 and returns to the second coolant supply apparatus 111 after it cools the housing 203. The second coolant supply apparatus 111 includes, as does the first coolant supply apparatus 109, a tank (not shown) for containing the coolant, a coolant circulation pump (not shown) for feeding the coolant, a coolant temperature controlling device (not shown) for cooling the coolant to be supplied to the housing 203 and controlling the coolant temperature to a predetermined temperature. Further, the second coolant supply apparatus 111 is connected to the machine controlling device 113 to receive a start-up signal for the first coolant supply apparatus 109 and information relative to the rotational speed N ($min^{-1}$) of the spindle 205.

A first cooling means, FIG. 2, includes the spindle core cooling passage 211, the first coolant supply apparatus 109, and a second cooling means includes the housing coolant passage 215 and the second coolant supply apparatus 111.

A bed temperature sensor 115, for detecting the temperature of the bed 103, is attached to the bed 103 and is connected to the first coolant supply apparatus 109. On the other hand, an inner race temperature sensor 119, for detecting the temperature of the inner race 207a of the bearing 207 supporting the front end portion of the spindle 205, and a outer race temperature sensor 121, for detecting the temperature of the outer race 207b of the bearing 207, are provided in the housing 203 of the spindle head 201. The inner race temperature sensor 119 is connected to the coolant temperature controlling device of the first coolant supply apparatus 109, and the outer race temperature sensor 121 is connected to the coolant temperature controlling device of the second coolant supply apparatus 111. The bed temperature sensor 115 and the outer race temperature sensor 121 may comprise a thermistor or a thermocouple which contacts with the bed 103 and outer race 207 directly to detect the temperatures thereof. The inner race temperature 119 preferably comprises a non-contacting temperature sensor such as an infrared temperature sensor to detect the temperature of the inner race 207a in non-contacting manner. The temperature of the inner race 207a may be represented by the surface temperature of a portion of the spindle 205 adjacent the inner race 207a. The inner and outer race temperature sensors 119 and 121 are preferably disposed at the bearing 207 for the loaded side of the spindle 205 to which a larger load is applied.

Figure 3:
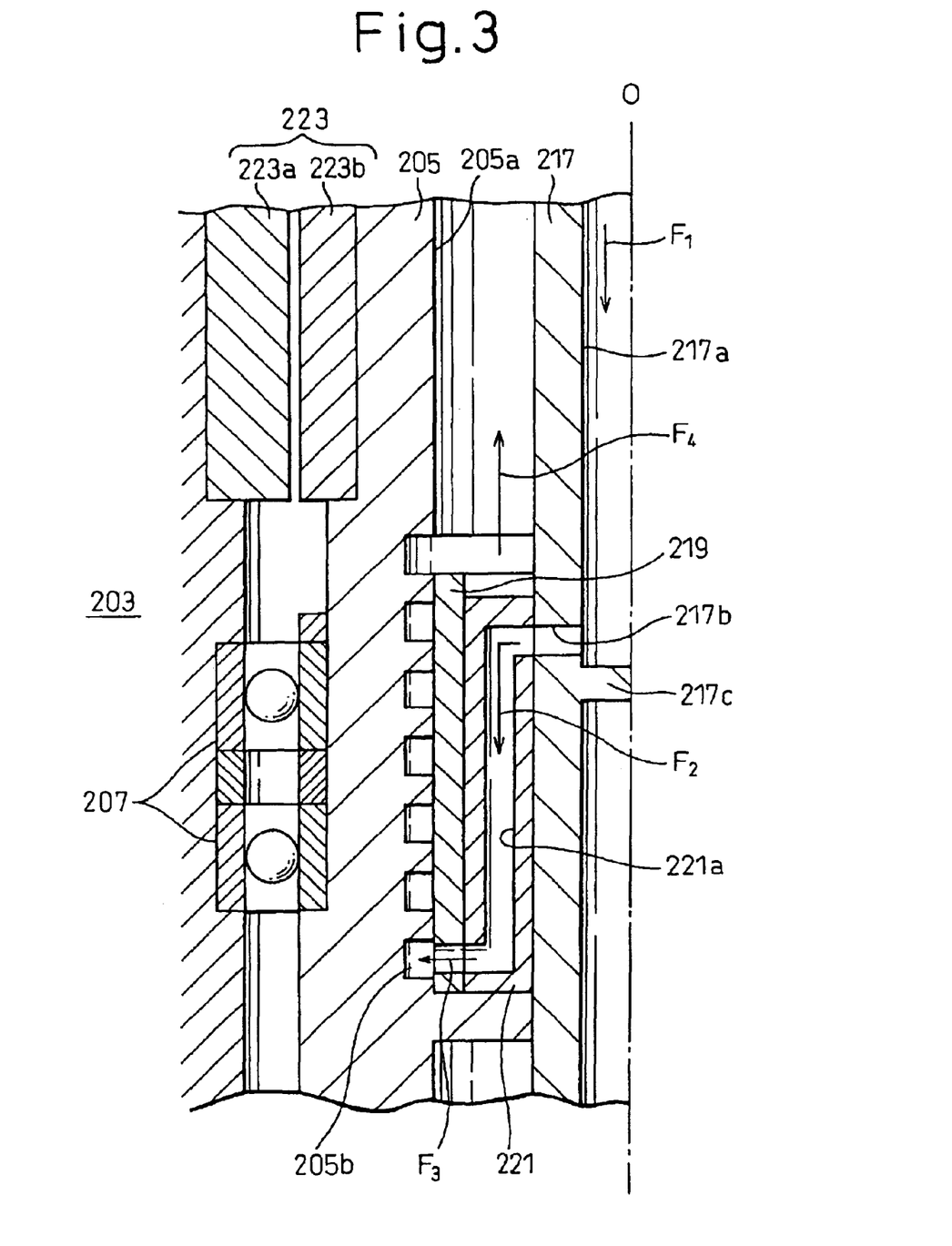
FIG. 3 is a partial section of the front end portion of the spindle of the machine tool of FIG. 2, showing a spindle core cooling passage provided with a spiral passage.

With reference to FIG. 3, an enlarged half section of the front end portion of the spindle 205 is indicated by reference "A" in FIG. 2. The spindle 205 defines a center bore 205a along the center axis O. In the center bore 205a, a draw bar 217, for securing the tool or tool holder T to the front end portion of the spindle 205, extends along the center axis O. The draw bar 217 defines a coolant supply passage 217a along the center axis O. The coolant supply passage 217a is connected, at its tail end (not shown) to the rotary joint 213. The coolant supply passage 217a further has a radially extending outlet port 217b adjacent its front end 217c. As shown in FIG. 3, by inserting the draw bar 217 into the center bore 205a of the spindle 205, a coolant return passage is defined between the outer surface of the draw bar 217 and the inner surface of the center bore 205a. Incidentally, in the embodiment of FIG. 3, the bearing is a double-row-type radial bearing having two ball bearings. Further, the spindle head 201 comprises a spindle drive motor 223 having a stator 223a secured to the inner surface of the housing 203 and a rotor 223b secured to the outer surface of the spindle 205.

The inner surface of the center bore 205a preferably defines a spiral groove 205b at the front end portion of the spindle 205, and a sleeve 219 is fitted into the center bore 205a to cover the spiral groove 205b. The spiral groove 205b and outer surface of the sleeve 219 defines a spiral passage. A connection sleeve 221, having a connection passage 221a, is disposed in the center bore 205a between the sleeve 219 and the draw bar 217. The connection passage 221a fluidly connected the outlet port 217b of the draw bar 217 to the front end portion of the spiral passage (the lowermost portion in FIG. 3). The coolant is supplied through the rotary joint 213 and sequentially flows through the coolant supply conduit 217a and the outlet port 217b of the draw bar 217, the connection passage 221a, the spiral passage and the coolant return passage, as shown by arrows F1 to F4, then returns to the first coolant supply apparatus 109 through the rotary joint 213. Thus, in the embodiment shown in FIG. 3, the spindle core cooling passage 211 comprises the coolant supply conduit 217a, the outlet port 217b, the connection passage 221a, the spiral passage and the coolant return passage.

In the connection with the spiral passage, by providing the spiral groove 205b, the surface area of the spindle 205 contacting with the coolant is increased to promote heat transfer at the portion having the spiral passage which allows effective cooling of the spindle 205. In order to cool the inner race 207a of the bearing 207 through the spindle 205, the spiral passage is preferably disposed at a portion which overlaps at least partially the bearing 207. Further, by forming the spiral groove 205 so that a screw moves toward the tail end relative to the rotational direction of the spindle, a pumping action is obtained, that is, the rotation of the spindle 205 forces the coolant in the spiral passage toward the tail end of the spindle. This facilitates the coolant to flow through the spindle core cooling passage.

The functional operation of the invention will be described below.

When the spindle drive motor 203 of the spindle 205 is activated by a command from the machine controlling device 113, the spindle 205 rotates and heat is generated in the bearings 207 and 209. The first and second coolant supply apparatuses 109 and 111 feed the coolant to the spindle core cooling passage 211 and the housing coolant passage 215 at the time of, or prior to, the activation of the spindle drive motor 103. The first coolant supply apparatus 109 controls the coolant temperature, on the basis of the temperatures Tb and Ti of the bed 103 and the inner race 207a detected by the bed temperature sensor 115 and the inner race temperature sensor 119 so that the temperature Ti of the inner race 207a becomes equal to the temperature Tb of the bed 103. In this connection, the coolant temperature may be controlled so that the temperature Ti of the inner race 207a becomes equal to the ambient temperature or a predetermined temperature.

The second coolant supply apparatus 111 receives information relative to the temperature Ti of the inner race 207a from the first coolant supply apparatus 109 and controls the coolant temperature so that the temperature To of the outer race 207b is higher that the temperature Ti of the inner race 207a by a predetermined temperature difference $\Delta T$. The temperature difference $\Delta T$ between the inner and outer races 207a and 207b may be determined to apply an appropriate internal pressure in the bearing relative to the rotational speed N ($min^{-1}$) of the spindle 205. The temperature difference $\Delta T$ may be preliminary determined by an experiment or by a numerical analysis and stored in the second coolant supply apparatus 111 in the form of a function or a table relative to the rotational speed N ($min^{-1}$) of the spindle 205 so that the temperature difference $\Delta T$ is calculated in the second coolant supply apparatus 111 on the basis of the information relative to the rotational speed N ($min^{-1}$) of the spindle 205 which is received from the machine controlling device 113.

Thus, by controlling the temperature of the coolant supplied from the second coolant supply apparatus 111 into the housing coolant passage 215 so that a temperature difference between the inner and outer races 207a and 207b is presented and, in particular, the temperature of the inner race 207a is higher than that of the outer race 207b by $\Delta T$, the temperature of the inner race 207a is maintained lower that that of the outer race 207b, which prevents an excess increase in the internal pressure generated by the expansion of the inner race 207a.

As described above, the internal pressure in a bearing is changed by the centrifugal force on the inner race in addition to the thermal deformation of the bearing. Therefore, the temperature difference $\Delta T$ which provides an appropriate internal pressure in the bearing changes according to the rotational speed of the spindle. According to the embodiment, by changing the temperature difference ΔT between the inner and outer races according to the rotational speed N (min$^{-1}$) of the spindle 205, control of the internal pressure in the bearing can be executed more precisely, compared with the above-described fourth prior art in which the temperature difference between the inner and outer races is controlled constantly in the high rotational speed range where the effect of the centrifugal force is increased. This also contribute to an increase in the endurance of the bearing and the reliability of the spindle apparatus.

Figure 4:
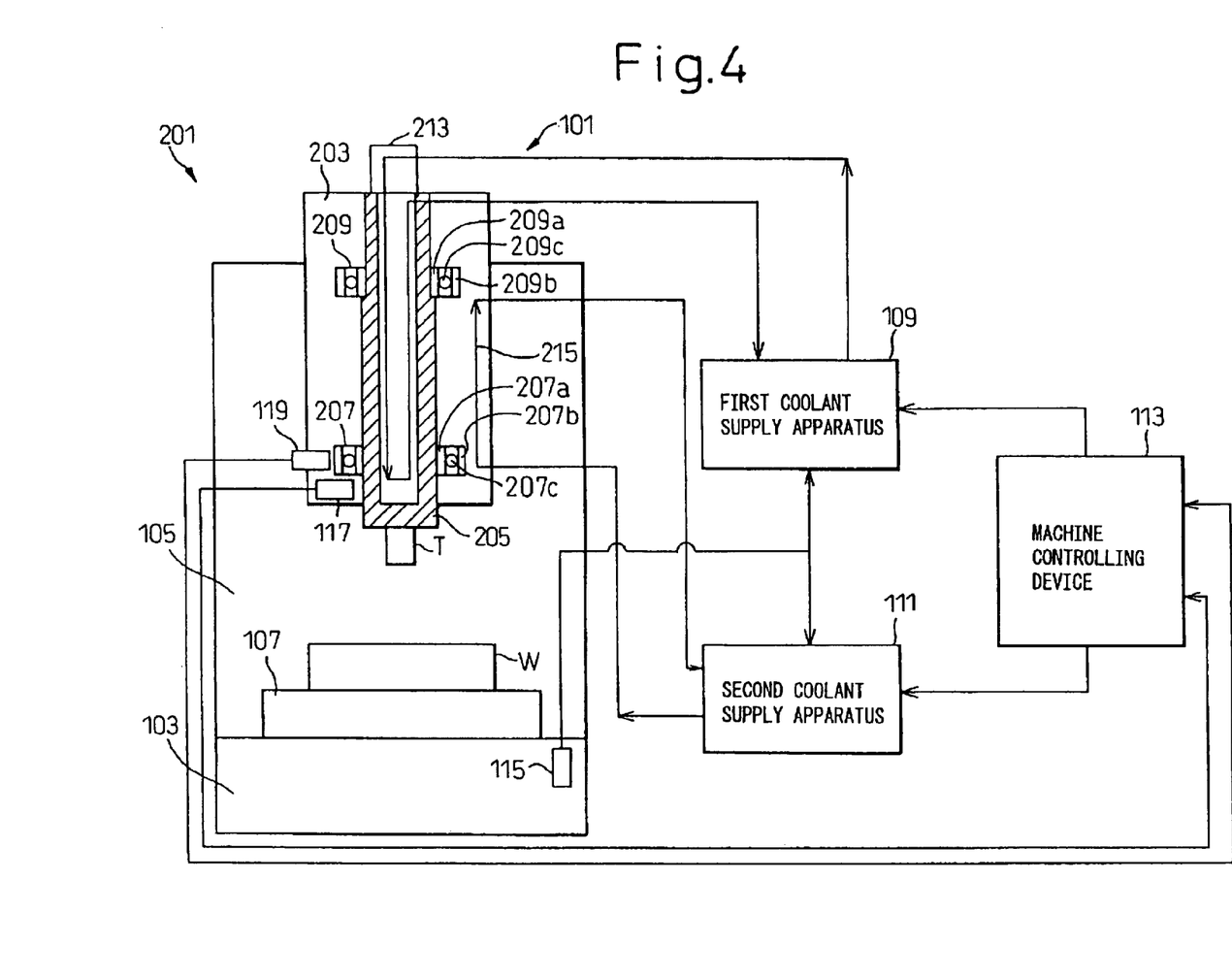
FIG. 4 is a schematic diagram of another embodiment of a machine tool which is provided with a rotating shaft apparatus of the invention.

With reference to FIG. 4, another embodiment of the present invention will be described below. The present embodiment has substantially the same configuration, and in FIG. 4, the elements similar to those of FIG. 2 are indicated by the same reference numbers.

In the embodiment shown in FIG. 4, the inner race temperature sensor 119 and the outer race temperature sensor 121, for detecting the temperatures Ti and To of the inner and outer races 207a and 207b, are connected to the machine controlling device 113. The first coolant supply apparatus 109 receives the information relative to the rotational speed N (min$^{-1}$) of the spindle 205 and the temperature Ti of the inner race 207a from the machine controlling device 113 and the temperature Tb of the bed 103 from the bed temperature sensor 115, and controls the coolant temperature so that the temperature Ti of the inner race 207a becomes equal to the temperature Tb of the bed 103. In this connection, the coolant temperature may be controlled so that the temperature Ti of the inner race 207a becomes equal to the ambient temperature or a predetermined temperature.

The second coolant supply apparatus 111 receives the information relative to the temperature Ti of the inner race 207a from the machine controlling device 113 and controls the coolant temperature so that the temperature To of the outer race 207b becomes higher than the temperature Ti of the inner race 207a by the predetermined temperature difference ΔT.

Further, an anomaly may be detected and displayed when the temperature difference between the inner and outer races 207a and 207b is at or higher than a predetermined value on the basis of the temperatures of the inner and outer races 207a and 207b detected by the inner race temperature sensor 119 and outer race temperature sensor 121.

Furthermore, the coolant temperature may be controlled so that the temperature of the outer race 207b becomes lower than that of the inner race 207a by ΔT whereas in the above-described first and second embodiments, the coolant temperature is controlled so that the temperature of the inner race 207a becomes higher than that of the outer race 207b by ΔT.

In the rotating shaft apparatus 11 shown in FIG. 1, the spindle core cooling passage and the housing coolant passage, shown in FIGS. 2 and 4, may be provided in the shaft 17 and the housing 13, respectively, to cool the shaft 17 and housing 13. A single coolant supply apparatus or two coolant supply apparatuses, as shown in FIGS. 2 and 4, may feed the coolant into the spindle core cooling passage and the housing coolant passage. The thermal deformation of the shaft 17 and the housing 13 can be reduced by cooling them.

Figure 5:
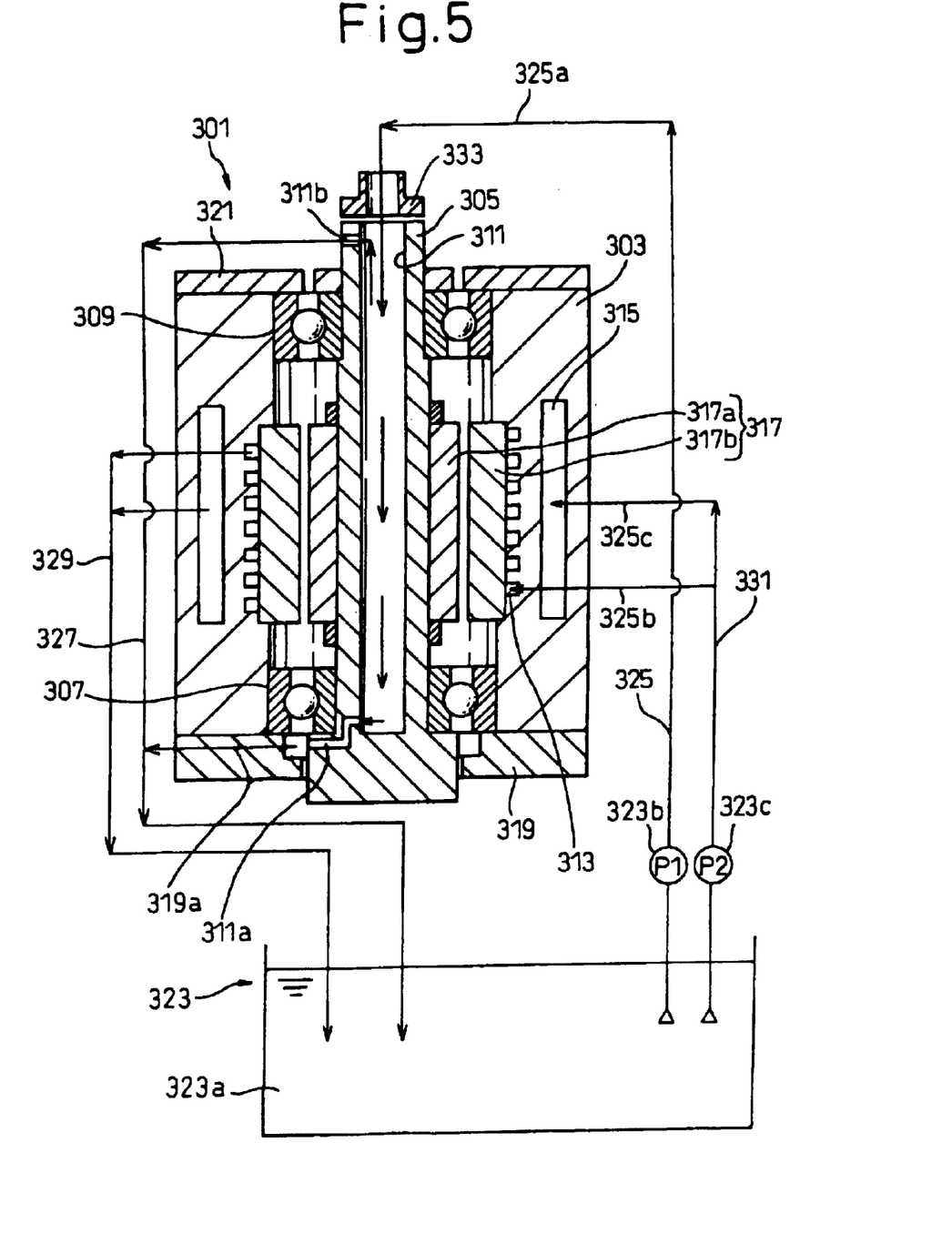
FIG. 5 is a section of another embodiment of a rotating shaft apparatus according to the invention.

With reference to FIG. 5, another embodiment of the invention will be described below.

In FIG. 5, a spindle apparatus 301 as the rotating shaft apparatus comprises a spindle 305 rotatably supported in a housing 303, 319 and 321 by bearings 307 and 309. As shown in FIG. 1, the spindle 305 may haes large and small diameter portions at the front and tail end portions thereof, respectively, the front large diameter portion being rotatably supported a radial bearing (bearing 307) and rear small diameter portion being rotatably supported by a pair of angular bearings (bearing 309). The housing 303, 319 and 321 has a housing body 303, a front cover 319 closing the front open end of the housing body 303 and a rear cover 321 closing the rear open end of the housing body 303. The spindle 305 defines a spindle core cooling passage 311 extending along the center axis, a front outlet port 311a extending radially from the spindle core cooling passage 311 at the front end portion of the spindle 305 and a rear outlet port 311b extending radially from the spindle core cooling passage 311 at the rear end portion of the spindle 305.

A drive motor 317 for rotationally driving the spindle 305 is disposed within the housing body 303. The drive motor 317 has a rotor 317a secured to the spindle 305 and a stator 317b secured to the inner surface of the housing body 303 facing the rotor 317a. The housing body 303 includes a spiral groove 313 defined in the inner surface of the housing body 303 disposed in a region where the stator 317b is disposed so as to define a spiral motor coolant passage 313 between the spiral groove 313 and the outer surface of the stator 317b. The housing body 303 further includes a housing coolant passage 315 defined by a cavity which is disposed to encompass the spiral motor coolant passage 313. Further, an outlet passage 319a is defined in the front cover 319 of the housing to fluidly communicate with the front outlet port 311a.

The spindle core cooling passage 311 is fluidly connected to a rotary joint 333 attached to the tail end of the spindle 305 so that the coolant is supplied into the spindle core cooling passage 311 from a coolant supply apparatus 323, having a tank 323a and a coolant circulation pump 323b, through a coolant supply conduit 325, a spindle core coolant supply conduit 325a and the rotary joint 333. A portion of the coolant supplied into the spindle core cooling passage 311 returns to the coolant supply apparatus 323 through the front outlet port 311a, the outlet passage 319a and a coolant return conduit 327. The rest of the coolant supplied into the spindle core cooling passage 311 returns to the coolant supply apparatus 323 through the rear outlet port 311b and the coolant return conduit 327.

The coolant circulation pump 323c of the coolant supply apparatus 323 feeds the coolant into the motor coolant passage 313 through a coolant supply conduit 331 and a motor coolant conduit 325b. At that time, a configuration may be conceived which allows the coolant supplied into the spiral motor coolant passage 313 to flow toward the rear end of the housing body 303 from the front end thereof. Likewise, the coolant circulation pump 323c of the coolant supply apparatus 323 feeds the coolant into the housing coolant passage 315 through the coolant supply conduit 331 and a housing coolant supply conduit 325c. The coolant supplied into the motor coolant passage 313 and the housing coolant passage 315 returns to the coolant supply apparatus 323 through a housing coolant return conduit 329. The coolant circulation pump for the motor coolant passage 313 and the housing coolant passage 315 may comprise separate pumps.

According to the embodiment, the housing coolant passage 315 is disposed radially outside of the motor coolant passage 313 so as to encompass it, and the coolant supplied into the motor coolant passage 313 removes the heat generated in the stator 317b, which prevents heat transfer to a substantial portion of the housing body 303. Further, the coolant supplied into the housing coolant passage 315 cools the housing body 303. Therefore, the thermal deformation of the housing body 303 due to the heat generation in the stator 317b is prevented.

Incidentally, a rotor coolant passage may be defined in the spindle 305, for the rotor 317a, so as to cool the rotor 317a by introducing the coolant from the spindle core cooling passage 311 into the rotor coolant passage.

What is claimed is:

1. A rotating shaft apparatus for rotationally driving a shaft characterized by a housing;

a shaft rotatably supported in the housing by a cylindrical roller bearing or a radial ball bearing, which has a larger diameter, at the loaded side thereof and by a pair of angular ball bearings, which have a smaller diameter, at the opposite side;

means for detecting the rotational weed of the shaft;

a drive motor for rotationally driving the shaft;

first cooling means, having a cooling passage defined in the shaft along the center axis thereof, for cooling the shaft with a coolant supplied into the coolant passage;

second cooling means, having a coolant passage defined in the housing, for cooling the shaft with the coolant supplied into the coolant passage;

inner race temperature detecting means for detecting the temperature of the inner race of the bearing for rotationally supporting the shaft at the loaded side;

outer race temperature detecting means for detecting the temperature of the outer race of the bearing for rotationally supporting the shaft at the loaded side;

the first cooling means controlling the temperature of the coolant to be supplied into the cooling passage of the shaft on the basis of the temperature of the inner race detected by the inner race temperature detecting means, and the second cooling means controlling the temperature of the coolant to be supplied into the cooling passage of the housing on the basis of the temperature of the outer race detected by the outer race temperature detecting means; and the second cooling means calculating a target temperature difference between the inner and the outer races which provides an appropriate internal pressure in the bearing for rotationally supporting the shaft at the loaded side on the basis of the rotational speed of the coolant detected by the rotational speed detecting means, and controlling the temperature of the coolant to be supplied into the coolant passage of the housing so that the temperature of the outer race of the bearing is higher than that of the inner race of the bearing by the calculated target temperature difference.

2. A rotating shaft apparatus for rotationally driving a shaft characterized by a housing;

a shaft rotatably supported in the housing by a plurality of bearings disposed apart from each other;

a drive motor for rotationally driving the shaft;

means for detecting the rotational weed of the shaft;

first cooling means, having a cooling passage defined in the shaft along the center axis thereof, for cooling the shaft with a coolant supplied into the coolant passage;

second cooling means, having a coolant passage defined in the housing, for cooling the shaft with the coolant supplied into the coolant passage;

inner race temperature detecting means for detecting the temperature of the inner race of the bearing for rotationally supporting the shaft at the loaded side;

outer race temperature detecting means for detecting the temperature of the outer race of the bearing for rotationally supporting the shaft at the loaded side;

the first cooling means controlling the temperature of the coolant to be supplied into the cooling passage of the shaft on the basis of the temperature of the inner race detected by the inner race temperature detecting means, and the second cooling means controlling the temperature of the coolant to be supplied into the cooling passage of the housing on the basis of the temperature of the outer race detected by the outer race detecting means; and the second cooling means calculating a target temperature difference between the inner and the outer races which provides an appropriate internal pressure in the bearing for rotationally supporting the shaft at the loaded side, on the basis of the rotational speed of the shaft detected by the rotational speed detecting means, and controlling the temperature of the coolant to be supplied into the coolant passage of the housing so that the temperature of the outer race of the bearing is higher than that of the inner race of the bearing by the calculated target temperature difference.

3. The rotating shaft according to claim 2, also including;

motor cooling means, disposed in the housing and having coolant passage for cooling the periphery of the stator, for cooling the motor with the coolant supplied into the coolant passage; and housing cooling means, disposed in the housing and having a coolant passage disposed outside of the motor cooling means, for cooling the housing with the coolant supplied into the coolant passage.

4. A rotating shaft apparatus according to claim 2, wherein the shaft is rotatably supported in the housing by a cylindrical roller bearing or a radial ball bearing, which has a larger diameter, at the loaded side thereof and by a pair of angular ball bearings, which have a smaller diameter, at the opposite side; and the first cooling means including a spiral passage defined in the housing adjacent to the cylindrical roller bearing or the radial ball bearing.

* * * * *